United States Patent
Chen et al.

(10) Patent No.: US 8,165,980 B2
(45) Date of Patent: Apr. 24, 2012

(54) DYNAMIC CONSTRAINT SOLVER WITH CROSS PROBLEM CONSTRAINTS

(75) Inventors: Gao Chen, Beijing (CN); Claire M. Bagley, Carlisle, MA (US)

(73) Assignee: Oracle International Corporation, Redwood Shores, CA (US)

( * ) Notice: Subject to any disclaimer, the term of this patent is extended or adjusted under 35 U.S.C. 154(b) by 662 days.

(21) Appl. No.: 12/358,687

(22) Filed: Jan. 23, 2009

(65) Prior Publication Data

US 2010/0191687 A1 Jul. 29, 2010

(51) Int. Cl.
*G06F 17/00* (2006.01)
*G06N 5/02* (2006.01)

(52) U.S. Cl. ........................................ 706/46
(58) Field of Classification Search ................. 706/46
See application file for complete search history.

(56) References Cited

U.S. PATENT DOCUMENTS

| | | | |
|---|---|---|---|
| 7,069,537 B2 | 6/2006 | Lazarov | |
| 7,266,534 B2 * | 9/2007 | Emek et al. | 706/45 |
| 7,333,968 B2 | 2/2008 | Geller et al. | |
| 2002/0107749 A1 | 8/2002 | Leslie et al. | |
| 2002/0143653 A1 | 10/2002 | DiLena et al. | |
| 2002/0166089 A1 | 11/2002 | Noy | |
| 2004/0019852 A1 | 1/2004 | Purvis | |
| 2005/0198621 A1 | 9/2005 | Tillmann et al. | |
| 2005/0278271 A1 | 12/2005 | Anthony et al. | |
| 2006/0218513 A1 * | 9/2006 | Dozorets et al. | 716/5 |
| 2007/0094184 A1 | 4/2007 | Emek et al. | |
| 2008/0189230 A1 * | 8/2008 | Copty et al. | 706/19 |

OTHER PUBLICATIONS

Frühwirth, Thom et al., "Principles of Constraint Systems and Constraint Solvers", Archives of Control Sciences: Special Issue on Constraint Programming, 16(2) http://www.informatik.uni-ulm.de/pm/mitarbeiter/fruehwirth/Papers/acs-systems3.pdf, 2006.
Lhomme, Olivier, "Consistency Techniques for Numeric CSPs", Proceedings in IJCAI-93 pp. 232-238, 1993 Chambery, France.
Selectica, "Selectica Configuration", Solution Overview, 2005, Selectica, Inc., San Jose, CA.
ILOG, "ILOG Configurator, Powering online product and service configuration applications", Product Datasheet, Mar. 2005, ILOG.S.A.
Oracle, "Oracle Configurator", Oracle Data Sheet, 2008, Oracle.
Tacton, "Tacton's Sales Configurator—Bridging the gap between engineering and sales for selling customized products.", http://www.tacton.com/templates/page_68.aspx?epslanguage=EN, 2007, Tacton Systems AB Sweden.

(Continued)

*Primary Examiner* — David R Vincent
*Assistant Examiner* — Ababacar Seck
(74) *Attorney, Agent, or Firm* — Squire Sanders (US) LLP

(57) ABSTRACT

A dynamic constraint solver solves a constraint satisfaction problem that includes a problem having zero or more ports, and zero or more sub-problems coupled to the zero or more ports. The solver stores a cross problem constraint template for cross problem constraints. The solver receives a request to connect a first sub-problem to a first port of a first problem. The solver then determines if the first sub-problem forms a participating problem combination for the cross problem constraint template. The participating problem combination includes all participating problems of the cross problem constraint. The solver then generates the cross problem constraint for the participating problem combination if the first sub-problem forms the participating problem combination.

19 Claims, 5 Drawing Sheets

OTHER PUBLICATIONS

Benhamou, Frédérick et al., "Applying Interval Arithmetic to Real, Integer and Boolean Constraints", Journal of Logic Programming, 32(1), 1997.

Sabin, Daniel et al., "Configuration as Composite Constraint Satisfaction", Proceedings of the (1st) Artificial Intelligence and Manufacturing Research Planning Workshop, 1996.

Fleischanderl, Gerhard et al., "Configuring Large Systems Using Generative Constraint Satisfaction", IEEE, pp. 59-68, No. 1094-7167/98, Jul./Aug. 2008, IEEE.

Mittal, Sanjay et al., "Dynamic Constraint Satisfaction Problems", Proceedings of the Eighth National Conference on Artificial Intelligence, 1996.

Stumptner, Markus et al., "Generative Constraint-Based Configuration of Large Technical Systems", Artificial Intelligence for Engineering Design, analysis and Manufacturing, pp. 307-320, No. 12, 1998, Cambridge University Press, USA.

Gelle, Esther et al., "Solving Methods for Conditional Constraint Satisfaction", IJCAL, 2003.

* cited by examiner

DYNAMIC CONSTRAINT SOLVER WITH CROSS PROBLEM CONSTRAINTS

FIELD OF THE INVENTION

One embodiment is directed generally to a computer system, and in particular to a constraint based computer system that solves dynamic constraint satisfaction problems.

BACKGROUND INFORMATION

Many of the tasks that are addressed by decision-making systems and artificial intelligence systems can be represented as constraint satisfaction problems ("CSP"s). In this representation, the task is specified in terms of a set of variables, each of which can assume values in a given domain, and a set of constraints that the variables must simultaneously satisfy. The set of variables, domains and constraints is referred to as a CSP. Each constraint may be expressed as a relation, defined over some subset of the variables, denoting valid combinations of their values. A solution to a CSP is an assignment of a value to all the variables from their respective domains that satisfies all of the constraints.

A constraint based system includes a constraint solver that attempts to find one or more solutions to a given CSP, or prove that no solution exists. Constraint based systems are used for many artificial intelligence related applications and a variety of other applications, including: (1) Product configurators; (2) Robotic control; (3) Temporal reasoning; (4) Natural language processing; (5) Spatial reasoning; (6) Test-case generation for software and hardware systems; (7) Machine vision; (8) Medical diagnosis; (9) Resource allocation; and (10) Frequency allocation.

The network of constraints in a CSP can be viewed as a graph, having a node for each variable and "arc" for each constraint. The members of each arc are the variables that appear in the constraint to which the arc corresponds. An arc is said to be consistent if for any variable of the arc, and any value in the domain of the variable, there is a valid assignment of values to the other variables on the arc that satisfies the constraint represented by the arc.

Classes of problems exist which are comprised of very large sets of variables that may only be conditionally related or required for a solution. One example of such problems is the configuration of large component-based systems. For example, selecting a type of hard disk controller for a computer configuration is not needed if a hard disk has not been chosen as a form of storage. If instead flash memory is chosen, a different set of variables and constraints would be required to be solved. Known CSP solvers do not allow the representation of conditional structure or reasoning over an inclusion of a variable in a solution. Techniques have been developed to allow such large problems to be represented as a set of smaller sub-problems, conditionally related through composition or association. A "dynamic constraint satisfaction problem" is one in which these sub-problems of variables and constraints can be incrementally added as required, either explicitly or as a result of inference from the propagation of constraints.

One known approach to minimize large CSP problems is referred to as "Conditional CSP", and includes the notion of a variable being active or inactive, as well as constraints to activate a variable. In this approach, a variable is only assigned a value in the final solution if it is active. Conditional CSP is limited in that it does not provide any significant space savings in large problems, nor does it allow for segmentation of related variables into sub-problems. Another known approach is referred to as "Generative CSP" and extends Conditional CSP by introducing the concept of components, which are groups of related variables, and component type, which is the further extension and specialization of these components. However, similar to Conditional CSP, Generative CSP is still implemented in terms of activity state and does not provide real space savings.

SUMMARY OF THE INVENTION

One embodiment is a dynamic constraint solver that solves a constraint satisfaction problem. The constraint satisfaction problem includes a problem having zero or more ports, and zero or more sub-problems coupled to the zero or more ports. The solver stores a cross problem constraint template for a cross problem constraint or constraints. The solver receives a request to connect a first sub-problem to a first port of a first problem. The solver then determines if the first sub-problem forms a participating problem combination for the cross problem constraint template. The participating problem combination includes all participating problems of the cross problem constraint. The solver then generates the cross problem constraint for the participating problem combination if the first sub-problem forms the participating problem combination.

DETAILED DESCRIPTION

One embodiment is a dynamic constraint based system that models a problem as a Constraint Satisfaction Problem by defining sub-problems of problems and defining constraints among sub-problems or constraints among problems and sub-problems. The constraints are defined through port variables so that they function as constraint templates that can be dynamically created or dynamically eliminated when necessary.

Figure 1:
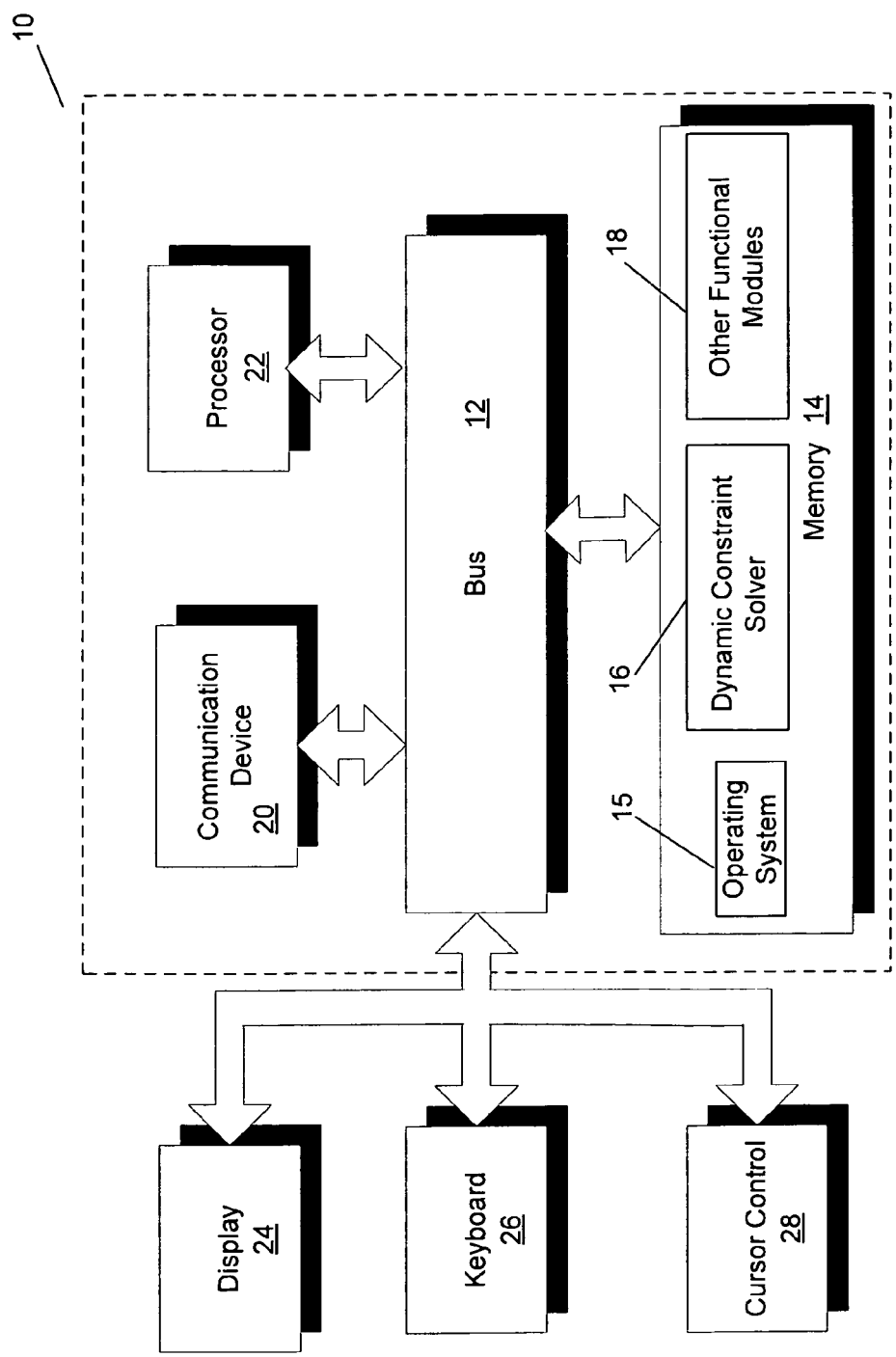
FIG. 1 is a block diagram of a dynamic constraint based system that can implement an embodiment of the present invention.

FIG. 1 is a block diagram of a dynamic constraint based system 10 that can implement an embodiment of the present invention. System 10 includes a bus 12 or other communication mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer readable media. System 10 further includes a communication device 20, such as a network interface card, to provide access to a network. Therefore, a user may interface with system 10 directly, or remotely through a network or any other method.

Computer readable media may be any available media that can be accessed by processor 22 and includes both volatile and nonvolatile media, removable and non-removable media, and communication media. Communication media may include computer readable instructions, data structures, program modules or other data in a modulated data signal such as a carrier wave or other transport mechanism and includes any information delivery media.

Processor 22 is further coupled via bus 12 to a display 24, such as a Liquid Crystal Display ("LCD"), for displaying information to a user. A keyboard 26 and a cursor control device 28, such as a computer mouse, is further coupled to bus 12 to enable a user to interface with system 10.

In one embodiment, memory 14 stores software modules that provide functionality when executed by processor 22. The modules include an operating system 15 that provides operating system functionality for system 10. The modules further include a dynamic constraint solver module 16 that performs dynamic constraint solving using cross problem constraints as disclosed in more detail below. System 10 can be part of a larger system that includes a constraint solver, such as a product configurator or artificial intelligence system. Therefore, system 10 will typically include one or more additional functional modules 18 to include the additional functionality.

Figure 2:
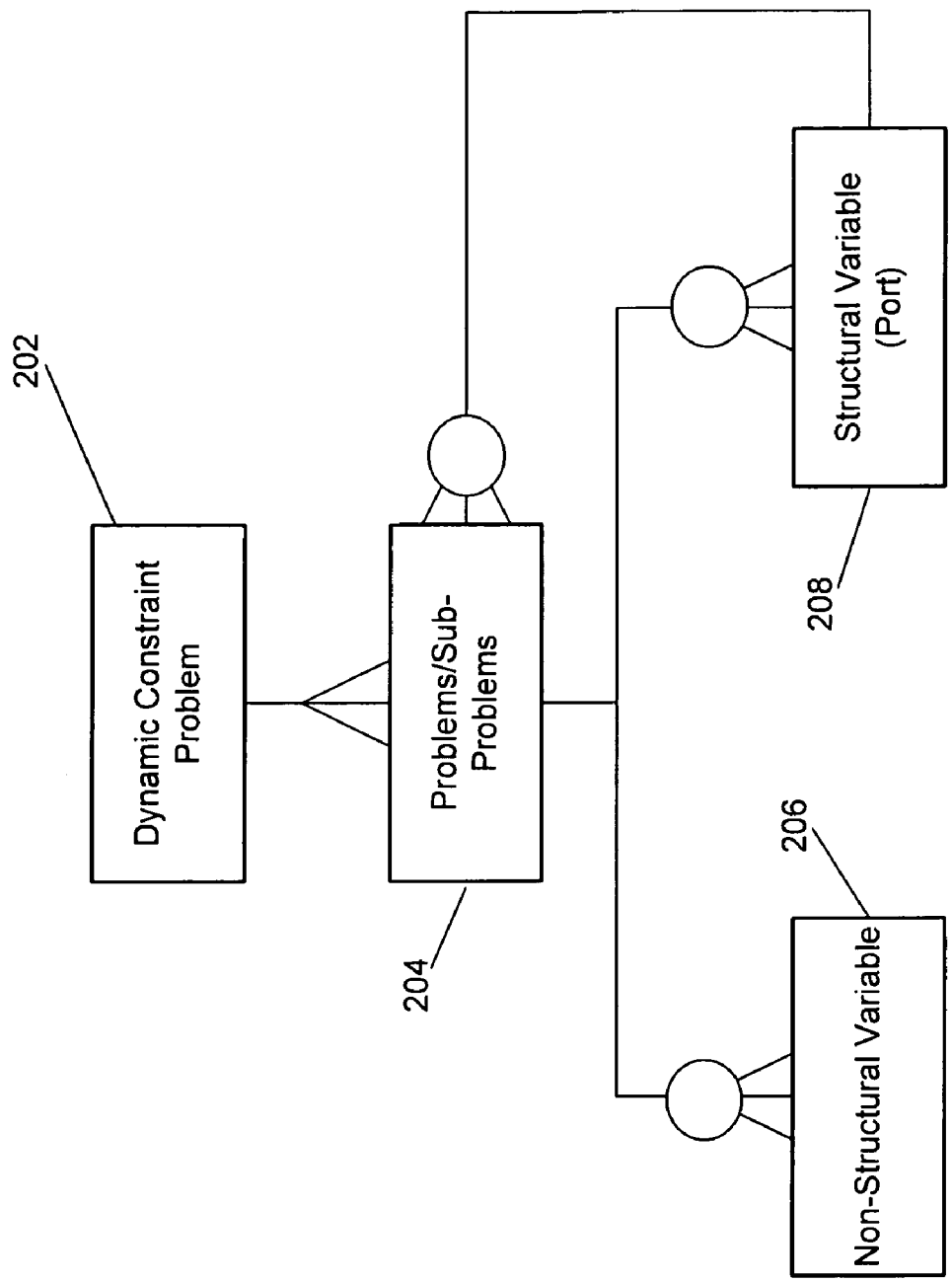
FIG. 2 illustrates the hierarchy of a dynamic constraint problem in accordance with one embodiment.

FIG. 2 illustrates the hierarchy of a model of a dynamic constraint problem 202 in accordance with one embodiment. The dynamic constraint problem 202 includes one or more problems or sub-problems 204 (a "sub-problem" may also be a "problem", and vice versa depending on where it falls in the hierarchy). Each problem is formed of zero or more non-structural variables 206. Examples of non-structural variables 206 includes Boolean variables, integers, floating point variables, etc. Each problem 204 may also include zero or more structural variables or "ports" 208. A port is a container for a problem and connects sub-problems to the problem or to another sub-problem. Each port 208 can be connected to zero or more sub-problems 204. In an embodiment where the dynamic constraint problem is for a product configurator, the problems/sub-problems are the components/sub-components of the configurator.

In a dynamic constraint problem, there typically are constraints across different problems (referred to as a "cross problem" constraint), such as a constraint between a problem and a sub-problem of the problem, or a constraint among multiple sub-problems of the same parent problem. However, since the problems that are involved in these cross problem constraints may be generated dynamically, the existence of the cross problem constraints themselves depends on the existence of the involved problems. In one embodiment, cross problems constraints are defined as templates and then created dynamically when all involved problems are generated.

As an example ("Example 1") of a cross problem constraint, consider a dynamic constraint model of a car that includes a non-structural variable (Engine Type) and a port for a tire that can connect to four or five tires (i.e., sub-problems), each having a variable for size:

```
Car (problem/component)
|_Engine Type
|_Port for Tire (min = 4, max = 5)
  |_Size
```

EXAMPLE 1

A constraint template can be defined between Engine Type and the size of each tire so that if the Engine Type is "Type A", the size of each tire must be 17". When a tire is selected or chosen, a cross-problem constraint is generated between the Engine Type and the newly generated tire's size. Therefore, when Tire#1 is created, the cross problem constraint generated is "if Engine Type is Type A, the size of Tire#1 is 17". Similarly when Tire#2 is created, the cross problem constraint generated is "if Engine Type is Type A, the size of Tire#2 is 17". As shown in this example, the original definition of the constraint is actually a constraint "template" that is used to create one or more new constraints when new sub-problems are generated and connected to a port. The constraint template functions as a "for all" universal quantifier because it applies to all new sub-problems that are generated.

As another more complex example ("Example 2"), consider the following dynamic constraint model where multiple ports are under Problem A:

```
ProblemA
|_PortToProblemB (min = 0, max = 1)
| |_x
|_PortToProblemC (min = 0, max = 2)
  |_PortToProblemD (min = max = 1)
  | |_y
  |_PortToProblemE (min = max = 1)
    |_z
```

EXAMPLE 2

Figure 3:
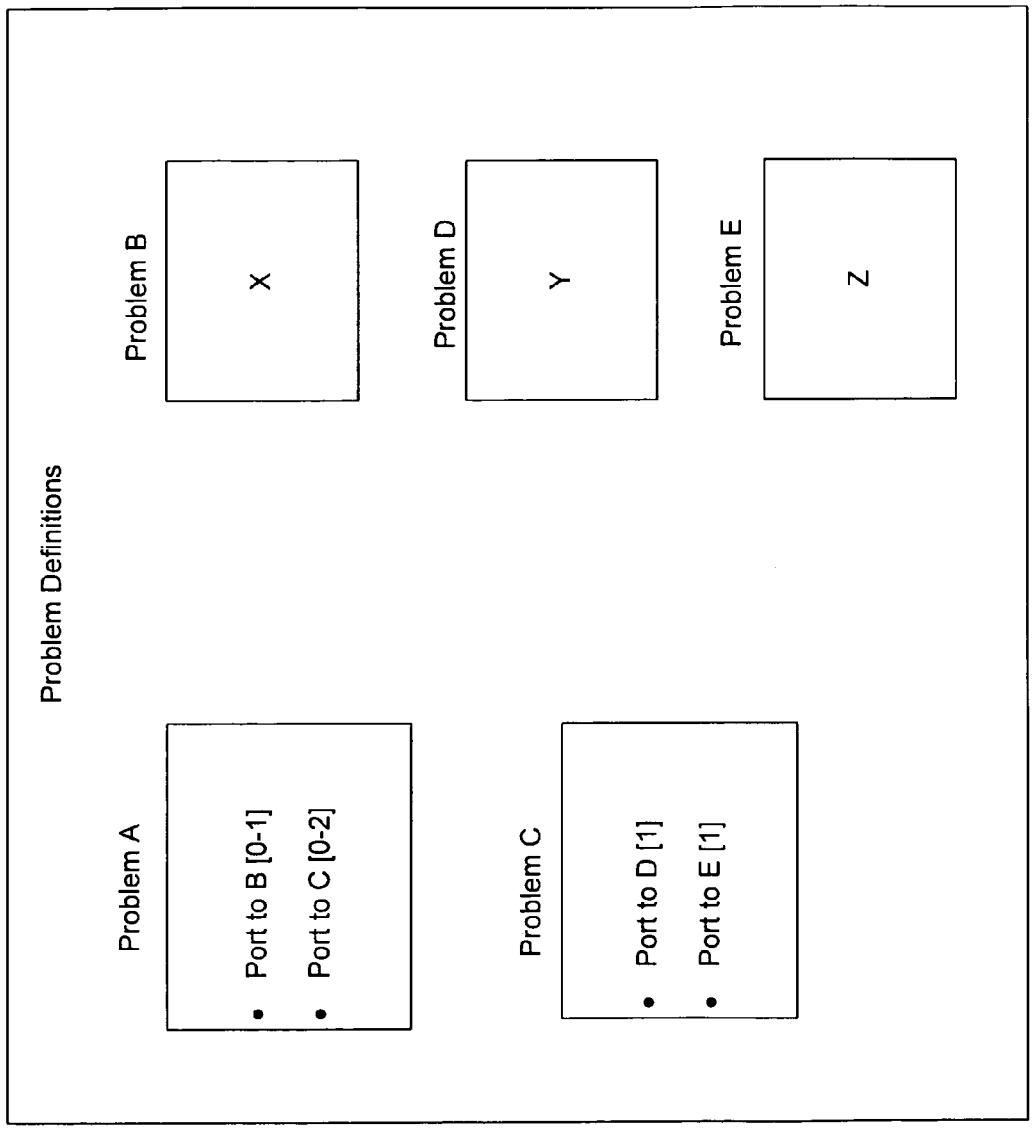
FIG. 3 illustrates Example 2 and the definitions for each problem in accordance with one embodiment.

FIG. 3 illustrates Example 2 and the definitions for each problem in accordance with one embodiment. As shown, the definition for problem A includes ports to problems B and C. The definition for problem C (assuming it exists/is connected to a port) includes ports to problems D and E. The definition for problem B includes the variable "X"; the definition for problem D includes the variable "Y", and the definition for problem E includes the variable "Z".

Figure 4:
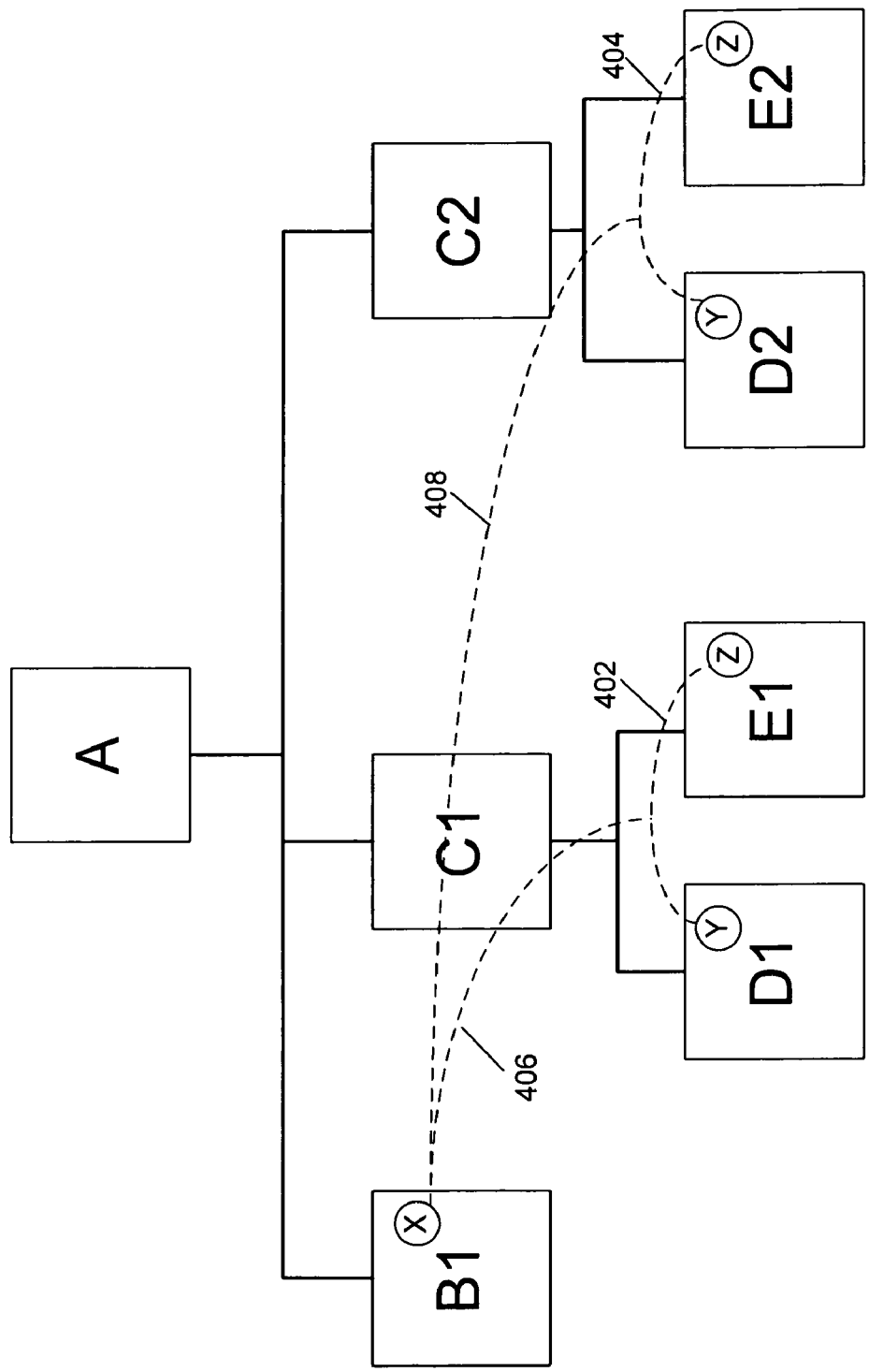
FIG. 4 illustrates an example of a run-time component structure of the problem definition of FIG. 3.

FIG. 4 illustrates an example of a run-time component structure of the problem definition of FIG. 3. In the example, as shown in FIG. 4, problem A includes one instance of sub-problem B ("B1") and two instances of sub-problem C ("C1" and "C2"). C1 includes sub-problems D and E ("D1" and "E1") and C2 also includes sub-problems D and E ("D2" and "E2"). In the model of FIG. 4, a cross problem constraint template exists that Y=Z but only if Y and Z are under the same sub-problem C. Therefore, when D1 and E1 are instantiated, actual cross problem constraint 402 will be generated. Similarly, when D2 and E2 are instantiated, actual cross problem constraint 404 will be generated. Constraints 402 and 404 are only generated as needed upon instantiation. Further, a cross-problem constraint template exists that X=(Y or Z) but only if Y and Z are under the same sub-problem C. Therefore, when B1 is instantiated, actual cross problem constraints 406 and 408 are generated.

One embodiment is the storage and tracking of the cross problem constraint templates so that the actual cross component constraints are generated as needed upon instantiation. In order to track the constraint templates, one embodiment determines "related problems" which are problems that share the same ancestor problem at the lowest possible level. In the example of FIG. 4, D1 and E1 are related problems since they share the same parent problem C1. On the other hand, D1 and E2 are not related problems since one belongs to C1 while the other belongs to C2.

One embodiment further determines a "participating problem combination" which is a set of problems that participate in the same constraint. In the example of FIG. 4, {B1, D1, E1} is a participating problem combination because it participates in constraint 406, and {B1, D2, E2} is another participating problem combination.

An embodiment determines a "participating problem sub-combination" as a subset of a participating problem combination and includes all participating problems of a constraint under a specified problem. In the example of FIG. 4, {D1, E1} is a sub-combination under C1 and {D2, E2} is a sub-combination under C2.

In one embodiment, for any problem a generation of participating problem (sub-)combinations can be generated by gathering all sub-combinations of its sub-problems, and then combining them. In the example of FIG. 4, Problem A has sub-problems B1, C1 and C2. On B1, there is a sub-combination {B1}. On C1, there is a sub-combination {D1, E1}. On C2, there is a sub-combination {D2, E2}. By combining the sub-combinations of B1 and C1, and combining the sub-combinations of B1 and C2, the two participating problem combinations are identified as {B1, D1, E1} and {B1, D2, E2}.

Finally, an embodiment generates cross problem constraints when on the root component, each participating problem combination contains all participants that are needed to generate the cross-problem constraint. For the example of FIG. 4, since two participating problem combinations are identified—{B1, D1, E1} and {B1, D2, E2}, two cross problem constraints for the constraint template of X=(Y or Z) can be generated—

B1.X=(D1.Y or E1.Z) [constraint 406 of FIG. 4]
B1.X=(D2.Y or E2.Z) [constraint 408 of FIG. 4]

Figure 5:
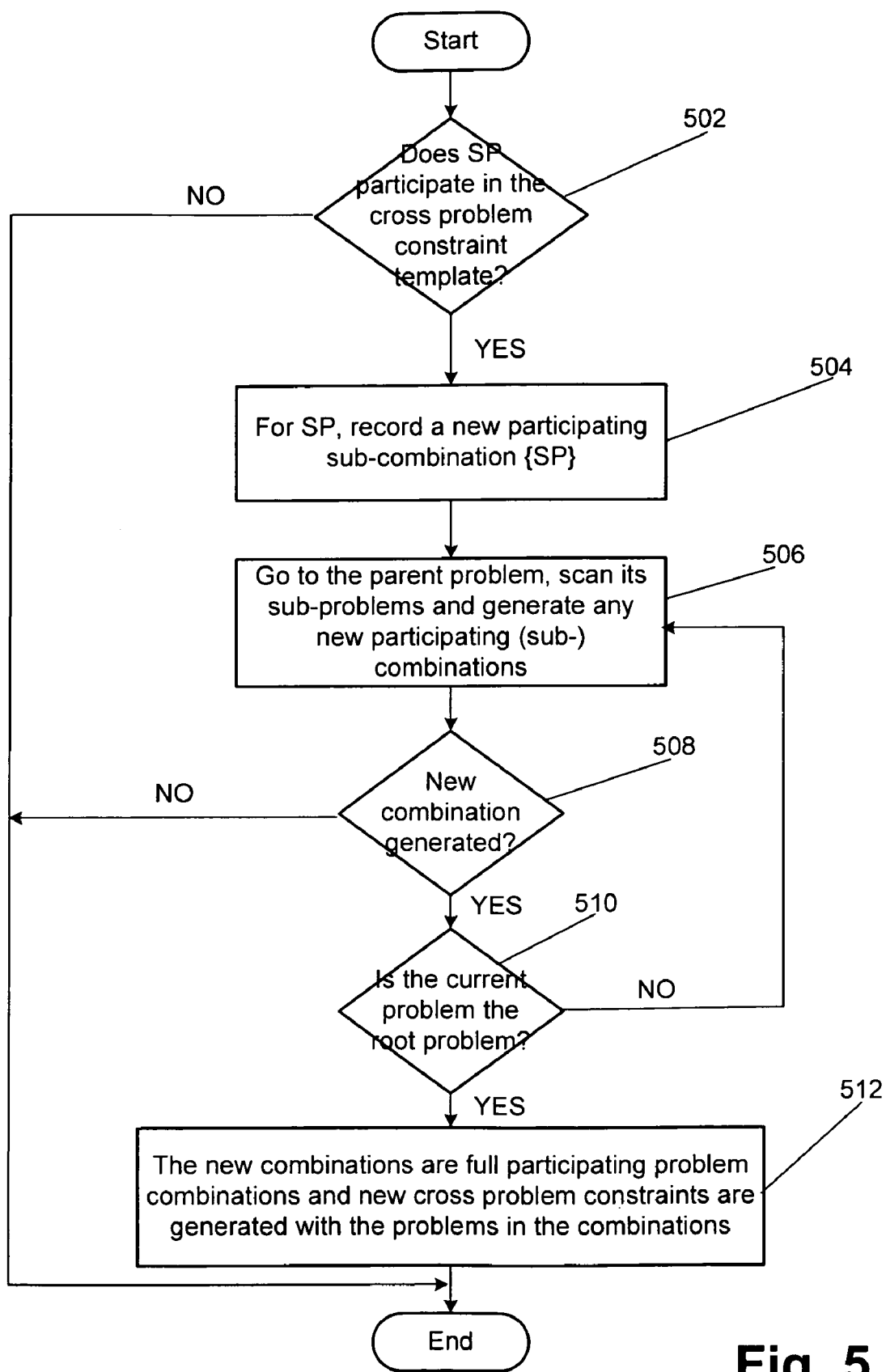
FIG. 5 is a flow diagram of the functionality of a dynamic constraint solver module when a new sub-problem is generated and connected to a problem.

FIG. 5 is a flow diagram of the functionality of dynamic constraint solver module 16 when a new sub-problem "SP" is generated and connected to a problem. It is assumed that solver 16 continuously tracks and determines related problems, participating problem combinations and participating problem sub-combinations as interactions are performed with the CSP model, and cross problem constraint templates. In one embodiment, the functionality of the flow diagram of FIG. 5 is implemented by software stored in memory or other computer readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

At 502, it is determined if the SP participates in the cross problem constraint template. If no, the functionality ends. If yes, the functionality goes to 504.

At 504 a new participating sub-combination {SP} for the SP is recorded.

At 506, solver 16 goes to the parent problem, scans its sub-problems, and generates any new participating (sub-) combinations.

At 508, it is determined if a new combination was generated at 506. If no, the functionality ends. If yes, the functionality goes to 510.

At 510, it is determined if the current problem is the root problem. If no, the functionality returns to 506. If yes, the functionality goes to 512.

At 512, the new combinations are full participating problem combinations and new cross problem constraints are generated with the problems in the combinations.

As disclosed, embodiments create cross problem constraint templates or for all constraints that cause a cross problem constraint to be generated when sub-problems are generated and the necessary problems for the constraint are instantiated. Therefore, cross problem constraints are efficiently represented and encapsulated.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A computer implemented method of solving a constraint satisfaction problem that comprises a model comprising a problem having zero or more ports, and zero or more sub-problems coupled to the zero or more ports, the method comprising:

storing a cross problem constraint template for one or more cross problem constraints;

receiving a request to connect a first sub-problem to a first port of a first problem, wherein the first sub-problem comprises a first sub-problem variable and the first problem comprises a first problem variable, and the first sub-problem is conditionally related to the first problem in the constraint satisfaction problem;

determining if the first sub-problem forms a participating problem combination for the cross problem constraint template, wherein the participating problem combination comprises all participating problems of the cross problem constraint; and generating the cross problem constraint for the participating problem combination;

wherein the cross problem constraint template determines the cross problem constraint between the first sub-problem and the first problem.

2. The method of claim 1, wherein the dynamic constraint satisfaction problem is a product configurator and the problem and sub-problems are components of the configurator.

3. The method of claim 1, wherein the determining if the first sub-problem forms the participating problem combination comprises determining related problems for the model.

4. The method of claim 1, wherein the determining if the first sub-problem forms the participating problem combination comprises determining a root problem for the first sub-problem.

5. The method of claim 1, wherein the cross problem constraint template is a for all universal quantifier.

6. The method of claim 1, wherein the cross problem constraint template generates the cross problem constraint when the first sub-problem is instantiated.

7. A non-transitory computer readable medium having instructions stored thereon that, when executed by a processor, causes the processor to function as a constraint solver for solving a constraint satisfaction problem that comprises a problem having zero or more ports, and zero or more sub-problems coupled to the zero or more ports, the instructions comprising:

storing a cross problem constraint template for a cross problem constraint;

receiving a request to connect a first sub-problem to a first port of a first problem, wherein the first sub-problem comprises a first sub-problem variable and the first problem comprises a first problem variable, and the first sub-problem is conditionally related to the first problem in the constraint satisfaction problem;

determining if the first sub-problem forms a participating problem combination for the cross problem constraint template, wherein the participating problem combination comprises all participating problems of the cross problem constraint; and generating the cross problem constraint for the participating problem combination;

wherein the cross problem constraint template determines the cross problem constraint between the first sub-problem and the first problem.

8. The computer readable medium of claim 7, wherein the dynamic constraint satisfaction problem is a product configurator and the problem and sub-problems are components of the configurator.

9. The computer readable medium of claim 7, wherein the determining if the first sub-problem forms the participating problem combination comprises determining related problems for the constraint satisfaction problem.

10. The computer readable medium of claim 7, wherein the determining if the first sub-problem forms the participating problem combination comprises determining a root problem for the first sub-problem.

11. The computer readable medium of claim 7, wherein the cross problem constraint template is a for all universal quantifier.

12. The computer readable medium of claim 7, wherein the cross problem constraint template generates the cross problem constraint when the first sub-problem is instantiated.

13. A dynamic constraint solver for solving a constraint satisfaction problem that comprises a model comprising a problem having zero or more ports, and zero or more sub-problems coupled to the zero or more ports, the solver comprising:

means for storing a cross problem constraint template for a cross problem constraint;

means for receiving a request to connect a first sub-problem to a first port of a first problem, wherein the first sub-problem comprises a first sub-problem variable and the first problem comprises a first problem variable, and the first sub-problem is conditionally related to the first problem in the constraint satisfaction problem;

means for determining if the first sub-problem forms a participating problem combination for the cross problem constraint template, wherein the participating problem combination comprises all participating problems of the cross problem constraint; and means for generating the cross problem constraint for the participating problem combination;

wherein the cross problem constraint template determines the cross problem constraint between the first sub-problem and the first problem.

14. A dynamic constraint solver comprising:

a processor; and a dynamic constraint solver module coupled to the processor;

wherein the dynamic constraint solver module stores a constraint problem having zero or more ports, and zero or more sub-problems coupled to the zero or more ports and stores a cross problem constraint template for a cross problem constraint;

wherein the dynamic constraint solver module, in response to receiving a request to connect a first sub-problem to a first port of a first problem, determines if the first sub-problem forms a participating problem combination for the cross problem constraint template, wherein the participating problem combination comprises all participating problems of the cross problem constraint, wherein the first sub-problem comprises a first sub-problem variable and the first problem comprises a first problem variable, and the first sub-problem is conditionally related to the first problem in the constraint satisfaction problem; and wherein the dynamic constraint solver module generates the cross problem constraint for the participating problem combination if it determines that the first sub-problem forms the participating problem combination for the cross problem constraint template;

wherein the cross problem constraint template determines the cross problem constraint between the first sub-problem and the first problem.

15. The dynamic constraint solver of claim 14, wherein the dynamic constraint solver module generates the cross problem constraint when the first sub-problem is instantiated.

16. The dynamic constraint solver of claim 14, wherein the dynamic constraint satisfaction problem is a product configurator and the problem and sub-problems are components of the configurator.

17. The dynamic constraint solver of claim 14, wherein the determining if the first sub-problem forms the participating problem combination comprises determining related problems for the model.

18. The dynamic constraint solver of claim 14, wherein the determining if the first sub-problem forms the participating problem combination comprises determining a root problem for the first sub-problem.

19. The dynamic constraint solver of claim 14, wherein the cross problem constraint template is a for all universal quantifier.

* * * * *

UNITED STATES PATENT AND TRADEMARK OFFICE
CERTIFICATE OF CORRECTION

PATENT NO. : 8,165,980 B2  
APPLICATION NO. : 12/358687  
DATED : April 24, 2012  
INVENTOR(S) : Chen et al.

Page 1 of 1

It is certified that error appears in the above-identified patent and that said Letters Patent is hereby corrected as shown below:

On front page, in column 2, under "Other Publications", line 10-11, delete "ILOG.S.A." and insert -- ILOG S.A. --, therefor.

On front page, in column 2, under "Other Publications", line 16, delete "AB" and insert -- AB, --, therefor.

Signed and Sealed this
Seventh Day of August, 2012

David J. Kappos
*Director of the United States Patent and Trademark Office*